United States Patent
Takita et al.

(10) Patent No.: US 8,446,023 B2
(45) Date of Patent: May 21, 2013

(54) COGENERATION APPARATUS CASE VENTING SYSTEM

(75) Inventors: Yoshiharu Takita, Wako (JP); Atsumu Naoi, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 28 days.

(21) Appl. No.: 13/334,393

(22) Filed: Dec. 22, 2011

(65) Prior Publication Data
US 2012/0187679 A1 Jul. 26, 2012

(30) Foreign Application Priority Data

Jan. 24, 2011 (JP) ................................ 2011-012256

(51) Int. Cl.
*B60L 1/02* (2006.01)
(52) U.S. Cl.
USPC .............................. 290/2; 454/152; 180/68.2
(58) Field of Classification Search
USPC ...................... 290/2; 454/152; 180/68.1, 68.2
See application file for complete search history.

(56) References Cited

U.S. PATENT DOCUMENTS

| 7,635,040 B2* | 12/2009 | Seo et al. ..................... 180/68.1 |
| 2008/0048509 A1 | 2/2008 | Murakami et al. | |
| 2010/0294580 A1* | 11/2010 | Kubota et al. ................ 180/68.1 |

FOREIGN PATENT DOCUMENTS

| EP | 1323906 A2 | 7/2003 |
| JP | 2006-009678 A | 1/2006 |

OTHER PUBLICATIONS

European Search Report dated Mar. 23, 2012, issued in corresponding European Patent Application No. 11195741.1.

* cited by examiner

*Primary Examiner* — Vanessa Girardi
(74) *Attorney, Agent, or Firm* — Westerman, Hattori, Daniels & Adrian, LLP

(57) ABSTRACT

A cogeneration apparatus having a ventilation-introducing channel communicating an electrical-equipment compartment with a ventilation fan is disclosed. Driving the ventilation fan causes air to be led from an exterior of a cogeneration case through the electrical-equipment compartment to the interior of the ventilation-introducing channel. The air led to the interior of the ventilation-introducing channel is led to an electrical generator. The air led to the electrical generator is exhausted through a power-generation compartment to the exterior of the cogeneration case.

8 Claims, 12 Drawing Sheets

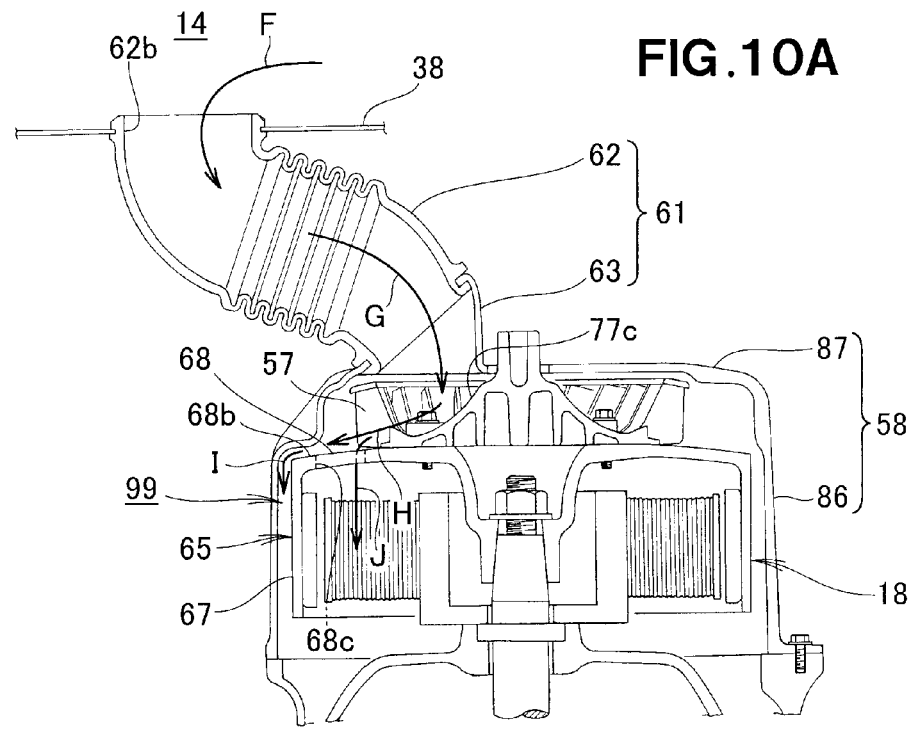

COGENERATION APPARATUS CASE VENTING SYSTEM

FIELD OF THE INVENTION

The present invention relates to a cogeneration apparatus capable of driving a ventilation fan to thereby ventilate the interior of a housing, and cooling electrical components, an electrical generator, and a motor.

BACKGROUND OF THE INVENTION

A well-known example of a cogeneration apparatus is disclosed in Japanese Patent Application Laid-Open Publication No. 2006-9678 (JP 2006-9678 A), in which an engine compartment is partitioned off within a housing (referred to as a "cogeneration case" below); an engine, an electrical generator, and a heat exchanger are provided to the engine compartment; and a ventilation fan and a radiator fan are provided for ventilating the engine compartment. Specifically, the interior of the cogeneration case is partitioned into the engine compartment, a duct compartment, a radiator compartment, and the like; and the engine, the electrical generator, and the heat exchanger are provided to the engine compartment. The ventilation fan is provided to a dividing wall between the engine compartment and the duct compartment, and the radiator fan is provided to the dividing wall between the radiator compartment and the exterior.

In the cogeneration apparatus disclosed in JP 2006-9678 A, the ventilation fan and the radiator fan are driven, whereby the ventilation fan allows air to be led to engine compartment from an exterior part, and allows air in the engine compartment to be led to the duct compartment. The radiator fan allows air in the duct compartment to be led to the radiator compartment, and allows air in the radiator compartment to be led to the exterior part. It is thereby possible for the air in the engine compartment to be ventilated, and the electrical generator and other components in the engine compartment to be cooled. In other words, the ventilation fan and the radiator fan serve as cooling fans.

However, the cogeneration apparatus according to JP 2006-9678 A is configured such that the engine and the electrical generator are provided to the engine compartment, and the air in the engine compartment is ventilated, whereby the electrical generator is cooled. The air in the engine compartment therefore rises due to the heat of the engine, and the risen air cools the electrical generator. Therefore, in order to cool the electrical generator, the size of the ventilation fan and the radiator fan must be increased, an air flow adequate for ventilation must be ensured, and rising of air in the engine compartment due to the heat of the engine must be limited.

Accordingly, the noise when driving the fans (i.e., the noise accompanying ventilation) increases when the ventilation fan and the radiator fan are increased in size. More heat than necessary is pulled from the engine and the heat exchanger, and making efficient use of the waste heat of the engine (motor) as a heat source is difficult.

SUMMARY OF THE INVENTION

It is an object of the present invention to provide a cogeneration apparatus in which noise when driving fans (i.e., noise accompanying ventilation) can be reduced, and waste heat of a motor can be efficiently used a heat source.

According to one aspect of the present invention, there is provided a cogeneration apparatus, which comprises: a housing having an interior space partitioned into a power-generation compartment and an electrical-equipment compartment communicating with atmosphere through an outside-air-introducing part; a motor accommodated in the power-generation compartment; an electrical generator accommodated in the power-generation compartment and adapted to be driven by the motor; a ventilation fan, accommodated in the power-generation compartment, for leading a cooling air flow to the electrical generator; a heat exchanger, accommodated in the power-generation compartment, for generating hot water using waste heat of the motor as a heat source; a control part, accommodated in the electrical-equipment compartment, for controlling the motor; and a power converter part, accommodated in the electrical-equipment compartment, for converting alternating-current power produced by the electrical generator into electrical power of a desired format, wherein the cogeneration apparatus further comprises a ventilation-introducing channel placing the electrical-equipment compartment in communication with the ventilation fan, so that driving the ventilation fan causes air to be led from outside the housing through the electrical-equipment compartment to inside the ventilation-introducing channel, the air led to inside the ventilation-introducing channel is led to the electrical generator, and the air led to the electrical generator is exhausted through the power-generation compartment to outside the housing.

The order of priority when cooling the control part and the power converter part (electrical equipment), the electrical generator, and the motor is generally considered to be: electrical equipment, electrical generator, and motor.

The control part and power converter part, which are electrical equipment, are accordingly accommodated in the electrical-equipment compartment in the present invention. The electrical-equipment compartment is provided with the ventilation-introducing channel for communicating with the ventilation fan. Driving the ventilation fan causes the air to be led from the exterior part of the housing through the electrical-equipment compartment to the interior of the ventilation-introducing channel, and causes the air led to the interior of the ventilation-introducing channel to be led to the electrical generator. The air that is led to the electrical generator is exhausted through the power-generation compartment to the exterior part of the housing.

Driving the ventilation fan thus causes air (outside air) to be led from the exterior part of the housing to the electrical-equipment compartment for ventilation. Leading air (outside air) to the electrical-equipment compartment allows the electronic devices (the control part and the power converter part) of the electrical-equipment compartment to be cooled by the air led in. The air that has cooled the electronic devices (the control part and the power converter part) of the electrical-equipment compartment is led through the ventilation-introducing channel to the electrical generator. Leading the air to the electrical generator allows the electrical generator to be cooled by the air led in. The air introduced from the exterior part of the housing (outside air) is thus used first to cool the electrical equipment (the control part and the power converter part) and then to cool the electrical generator, whereby cooling can be performed efficiently with preference given to devices having high cooling priority. The air introduced from the exterior part of the housing (ventilating air flow) can therefore be limited to an appropriate volume, and the size of the ventilation fan need not be increased in order to ensure a large volume of air flow for ventilation. It is thereby possible to reduce the noise when driving the fan (i.e., the noise accompanying ventilation).

Limiting increases in the size of the ventilation fan also prevents the pulling of more heat than necessary from the motor and the heat exchanger, and allows hot water to be properly generated, the waste heat of the motor being efficiently used as a heat source. Limiting increases in the size of the ventilation fan also makes it possible to reduce electrical power used when driving the ventilation fan (electrical driving power). Lessening the electrical driving power of the ventilation fan thus allows the efficiency of electricity generation of the electrical generator to be increased.

In the cogeneration apparatus described in the prior art, the aperture part is provided to the dividing-wall part for partitioning the electrical-equipment compartment and the power-generation compartment, and the ventilation fan is provided to the aperture part. The noise when driving the motor therefore readily leaks through the ventilation fan to the exterior part of the housing, and excessive noise-preventing measures and noise-absorbing measures are needed.

In contrast, in the present invention, the ventilation-introducing channel is interposed between the electrical-equipment compartment and the ventilation fan. It is therefore possible to inhibit the noise when driving the motor from leaking through the ventilation fan to the exterior part of the cogeneration case. It is thereby possible to obviate excessive noise-preventing measures and noise-absorbing measures as in the cogeneration apparatus of the prior art.

It is preferable that the electrical generator and the ventilation fan be covered by a fan cover and the ventilation-introducing channel have a channel outlet opening into the fan cover, so that air is led from the channel outlet of the ventilation-introducing channel to inside the fan cover to cool the electrical generator and is then led from inside the fan cover to the electrical-equipment compartment.

The air led out to the power-generation compartment can therefore be used to cool the motor of the power-generation compartment. Leading the air out from the interior of the fan cover to the power-generation compartment allows the internal pressure of the power-generation compartment to be kept higher than the external pressure of the housing (i.e., the internal pressure of the power-generation compartment is kept positive). It is thereby possible for the air led out to the power-generation compartment to be smoothly exhausted to the exterior part of the housing. Smoothly exhausting the air in the power-generation compartment to the exterior part of the housing allows temperature increases of the power-generation compartment to be limited and allows the temperature of the power-generation compartment to be kept at a proper level. Keeping the temperature of the power-generation compartment at a proper level allows increases in fuel temperature to be limited even when a part of a fuel channel for leading fuel to the engine is positioned in the power-generation compartment. Keeping the power-generation compartment at a proper temperature thus allows increases in fuel temperature to be limited and allows fuel to be stably and efficiently supplied to (filled into) the engine.

Preferably, the ventilation-introducing channel has a channel inlet that opens into the electrical-equipment compartment and is disposed higher than the channel outlet of the ventilation-introducing channel. The channel outlet of the ventilation-introducing channel opens into the fan cover. The ventilation fan is covered by the fan cover. The ventilation fan is therefore provided toward the channel outlet of the ventilation-introducing channel. It is thereby possible for the air that flows into the ventilation fan to be smoothly led from higher to lower, and for pressure losses to be minimized when air (cooling air flow) is led to the ventilation fan.

It is desirable that the housing comprise an exhaust passage having an exhaust inlet and an exhaust outlet for exhausting to an exterior part air led out to the power generation compartment, the exhaust inlet communicating with the power-generation compartment, and the exhaust outlet communicating with the exterior part, and the exhaust inlet be disposed higher than the motor and the heat exchanger. The air led out to the power-generation compartment (cooling air flow) can accordingly be guided through the region above the motor and the heat exchanger to the exhaust inlet. The air that is heated in the periphery of the motor and the heat exchanger rises due to convection. The air that has risen to the region above the motor and the heat exchanger can therefore be led to the exhaust inlet while being taken along with the flow of the cooling air. The air that is heated in the periphery of the motor and the heat exchanger is thereby efficiently led out (exhausted) from the power-generation compartment by the cooling air flow, and the power-generation compartment can be properly cooled.

It is preferable that the fan cover comprise a cover outlet for leading air from the interior of the fan cover to the power-generation compartment, and the cover outlet be disposed lower than the exhaust inlet.

The air that is heated in the periphery of the motor and the heat exchanger rises due to convection, as described above. Accordingly, providing the cover outlet lower than the exhaust inlet allows the air led out from the cover outlet to the power-generation compartment (cooling air flow) to be guided at an upward incline toward the exhaust inlet. The air that has risen to the region above the motor and the heat exchanger can accordingly be guided to the exhaust inlet without being unnecessarily disturbed by the air led out from the cover outlet (cooling air flow). The air that is heated in the periphery of the motor and the heat exchanger is thereby efficiently exhausted from the power-generation compartment by the cooling air flow, and the power-generation compartment can be properly cooled.

It is preferable that the electrical generator within the fan cover be linked to a crankshaft of the motor, the ventilation fan comprise an adjustment boss linked to the electrical generator and protruding upward from a cover aperture of the fan cover so that the crankshaft is rotated by operating the adjustment boss from outside the fan cover, and the channel outlet of the ventilation-introducing channel be formed at an offset site of the fan cover, located away from the cover aperture of the fan cover. The adjustment boss can thus be provided remotely from the channel outlet of the ventilation-introducing channel, an offset wrench or other tool can be engaged with the adjustment boss, and the adjustment boss can be rotated.

Turning the adjustment boss causes the crankshaft to turn and positions the piston at a top dead center. In this state, the intake valve and the exhaust valve are closed, and the gap between the valve shafts and the rocker arms (i.e., the tappet clearance) can be readily adjusted.

Desirably, the channel inlet of the ventilation-introducing channel and the channel outlet of the ventilation-introducing channel are both set to have a fixed cross-sectional channel area. Pressure losses in the air that flows through the ventilation-introducing channel can therefore be minimized when the air in the electrical-equipment compartment is led through the ventilation-introducing channel to the power-generation compartment.

In a preferred form, the exhaust passage comprises a sound-absorbing material. The noise when driving the fan (i.e., the noise accompanying ventilation) can therefore be absorbed by the sound-absorbing material, and noise when driving the fan can be further reduced.

BRIEF DESCRIPTION OF THE DRAWINGS

A preferred embodiment of the present invention will be described in detail below, by way of example only, with reference to the accompanying drawings, in which

FIGS. 10A and 10B are views illustrating how an electrical generator is cooled;

DETAILED DESCRIPTION OF THE PREFERRED EMBODIMENT

Figure 1:
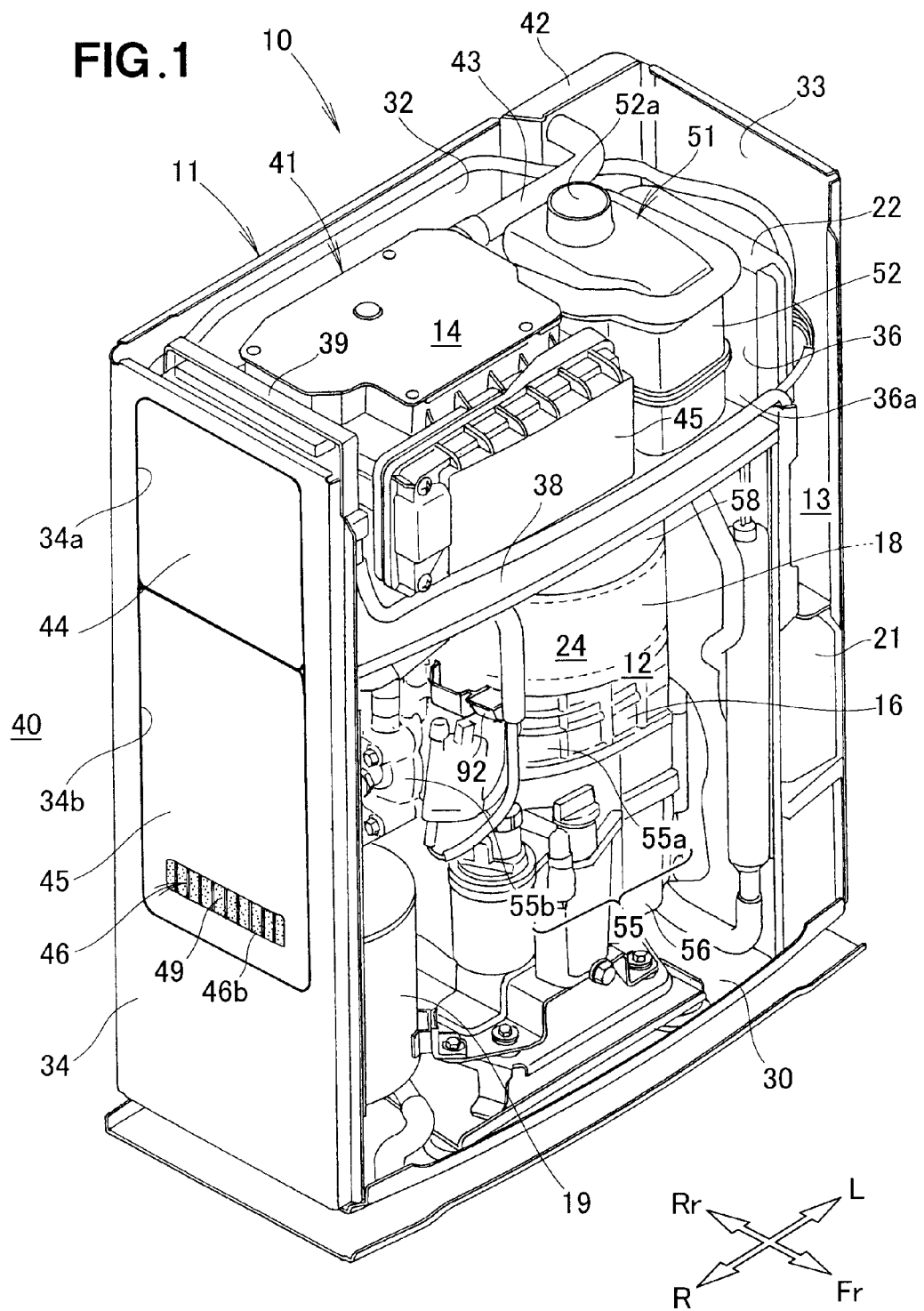
FIG. 1 is a perspective view that shows a cogeneration apparatus according to the present invention, as seen from the front thereof.

Throughout the description made as to the embodiment of the present invention with reference to the accompanying drawings, reference characters "Fr," "Rr," "L," and "R" are used to represent "front," "rear," "left," and "right", respectively.

Figure 2:
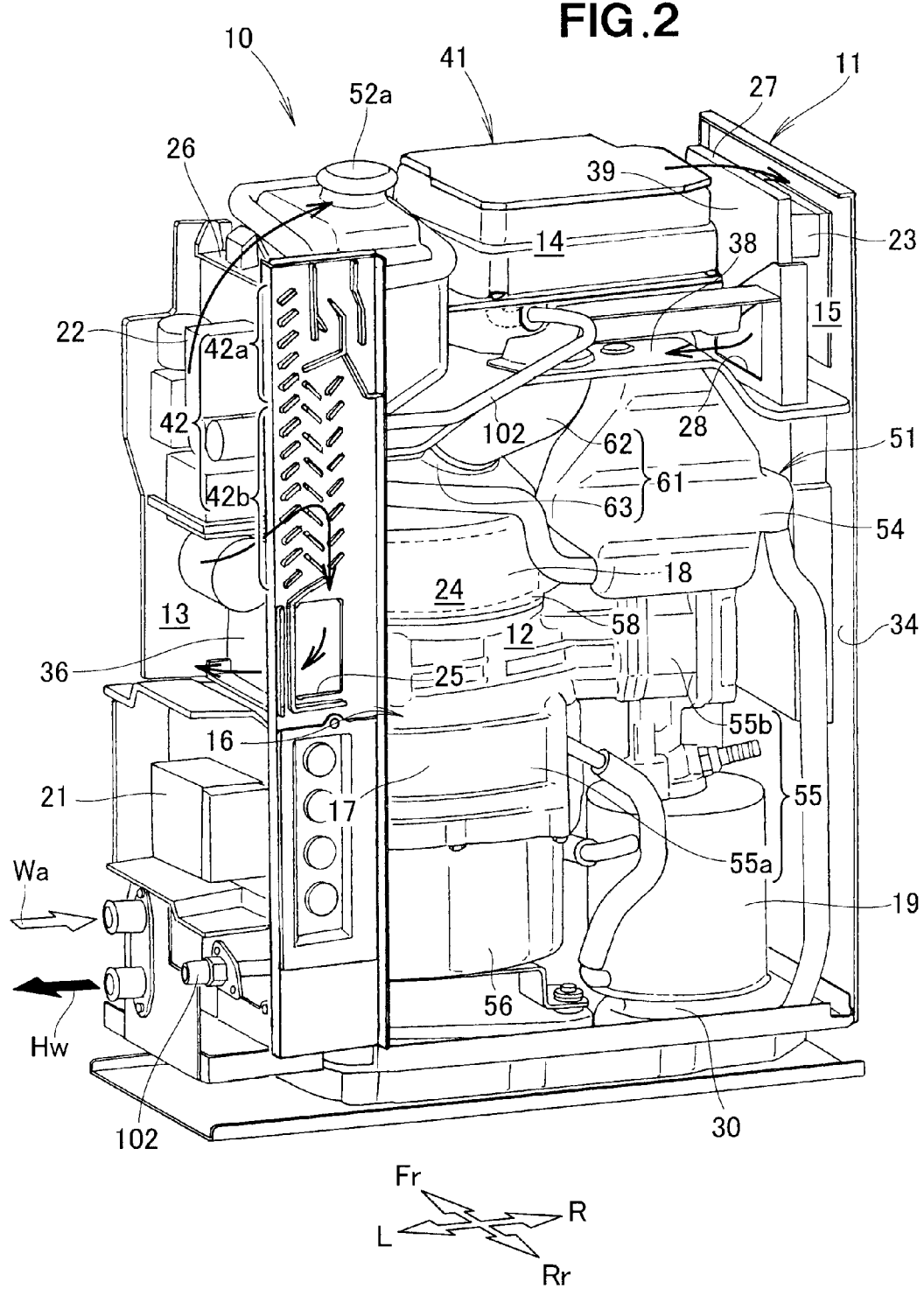
FIG. 2 is a perspective view showing the cogeneration apparatus of FIG. 1, as seen from the rear thereof.

As shown in FIGS. 1 and 2, a cogeneration apparatus 10 is a combined heat-and-power apparatus that is provided with a cogeneration case (housing) 11, an engine (motor) 16 that is accommodated within the cogeneration case 11, an electrical generator 18, a heat exchanger 19, a first control part 21, a second control part 23, and a power converter part 22.

The cogeneration case 11 is formed into a substantially rectangular shape by a bottom part 30, a front panel (not shown), a rear panel 32, a left side panel 33, a right side panel 34, and a roof panel (not shown), whereby an interior space 24 is formed. An upper-panel aperture part 34a and a lower-panel aperture part 34b are formed in the right side panel 34. The right side panel 34 is provided with an upper sub-side panel 44 that can open and close the upper-panel aperture part 34a, and a lower sub-sidepanel 45 that can open and close the lower-panel aperture part 34b.

Figure 3:
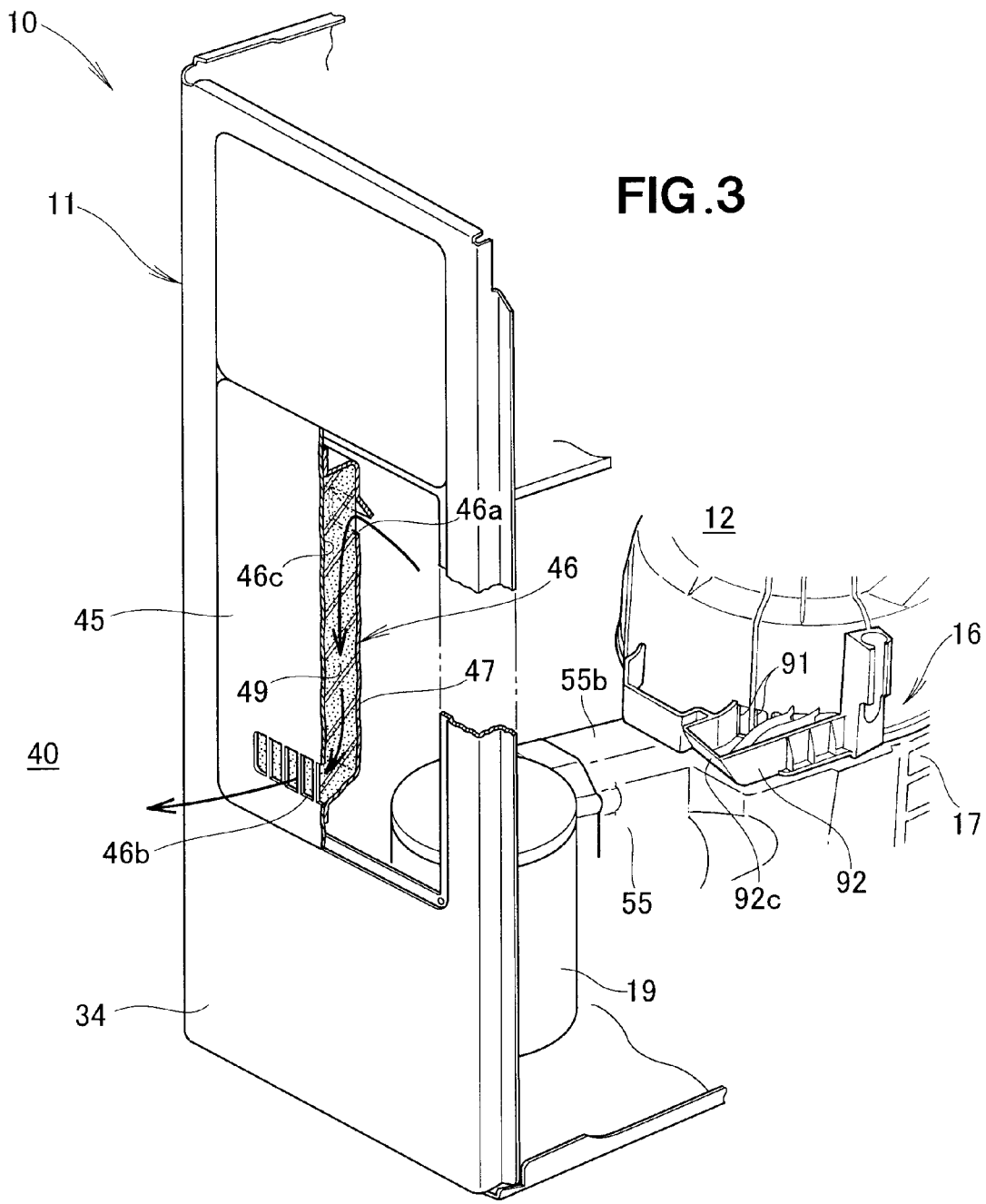
FIG. 3 is perspective view showing a lower sub-sidepanel of FIG. 1.

A guide guard 47 is provided to the back surface of the lower sub-sidepanel 45, as shown in FIG. 3. An exhaust passage 46 is formed by the lower sub-sidepanel 45 and the guide guard 47. In the exhaust passage 46, an exhaust inlet 46a is formed on the upper part of the guide guard 47, and an exhaust outlet 46b is formed on the lower part of the lower sub-sidepanel 45.

A sound-absorbing material 49 (e.g., a urethane foam (urethane sponge)) is provided to a space 46c within the exhaust passage 46 (i.e., a space between the lower sub-sidepanel 45 and the guide guard 47). The exhaust inlet 46a communicates with a power-generation compartment 12 that is described hereinafter. The exhaust outlet 46b communicates with an exterior (atmosphere) 40 of the cogeneration case 11.

Providing the sound-absorbing material 49 to the space 46c within the exhaust passage 46 allows the noise of the power-generation compartment 12 (i.e., the noise accompanying ventilation when driving a fan) to be absorbed by the sound-absorbing material 49 and allows the noise to be reduced. The sound-absorbing material 49 is formed from, e.g., urethane foam (a urethane sponge), whereby the air in the power-generation compartment 12 can be guided through the sound-absorbing material 49 to the exterior (atmosphere) 40.

The exhaust inlet 46a of the exhaust passage 46 is provided higher than the engine 16 (specifically, an engine body 17) and the heat exchanger 19. The air led out to the power-generation compartment 12 (cooling air flow) can accordingly be guided through the region above the engine body 17 and the heat exchanger 19 to the exhaust inlet 46a.

The air that is heated in the periphery of the engine body 17 and the heat exchanger 19 rises due to convection. The air that has risen to the region above the engine body 17 and the heat exchanger 19 can be led to the exhaust inlet 46a while being taken along with the flow of the cooling air. The air that is heated in the periphery of the engine body 17 and the heat exchanger 19 is thereby efficiently led out (exhausted) from the power-generation compartment 12 by the cooling air flow, and the power-generation compartment 12 can be properly cooled.

A left dividing wall 36 is provided near the left side panel 33 within the cogeneration case 11 at a predetermined interval from the left side panel 33, as shown in FIGS. 1 and 2. An upper dividing part 38 is provided so as to extend from an upper end part 36a of the left dividing wall 36 to the right side panel 34. A right dividing wall 39 is provided near the right side panel 34 in the region above the upper dividing part 38 within the cogeneration case 11 at a predetermined interval from the right side panel 34.

Providing the left dividing wall 36 within the cogeneration case 11 allows the interior space 24 within the cogeneration case 11 to be partitioned into left and right spaces: the power-generation compartment 12 and a first electrical-equipment compartment (electrical-equipment compartment) 13. Providing the upper dividing part 38 within the cogeneration case 11 allows the space of an intake/exhaust part (electrical-equipment compartment) 14 to be partitioned in the region above the power-generation compartment 12. Providing the right dividing wall 39 to the region above the upper dividing part 38 within the cogeneration case 11 allows a second electrical-equipment compartment (electrical-equipment compartment) 15 to be partitioned near the right dividing wall 39 in the space of the intake/exhaust part 14.

The first electrical-equipment compartment 13 has a first communicating aperture 25 that communicates with an outside-air-introducing part 42 below the outside-air-introducing part 42, which introduces air from outside the cogeneration case 11, that is, from the atmosphere. The first electrical-equipment compartment also has on an upper part a second communicating aperture 26 for communicating with the intake/exhaust part 14. Air outside the cogeneration case 11 is therefore introduced through the outside-air-introducing part 42 to the interior thereof, and the introduced air can be led through the first communicating aperture 25 to the first electrical-equipment compartment 13. The air led to the first electrical-equipment compartment 13 can be led through the second communicating aperture 26 to the upper part of the intake/exhaust part 14.

The second electrical-equipment compartment 15 has on an upper part a third communicating aperture 27 that communicates with the intake/exhaust part 14, and has on a lower part a fourth communicating aperture 28 that communicates with the intake/exhaust part 14. The air led to the upper part of the intake/exhaust part 14 is led through the third communicating aperture 27 to the second electrical-equipment compartment 15, and the air led to the second electrical-equipment compartment 15 can be returned through the fourth communicating aperture 28 to the lower part of the intake/exhaust part 14.

Figure 4:
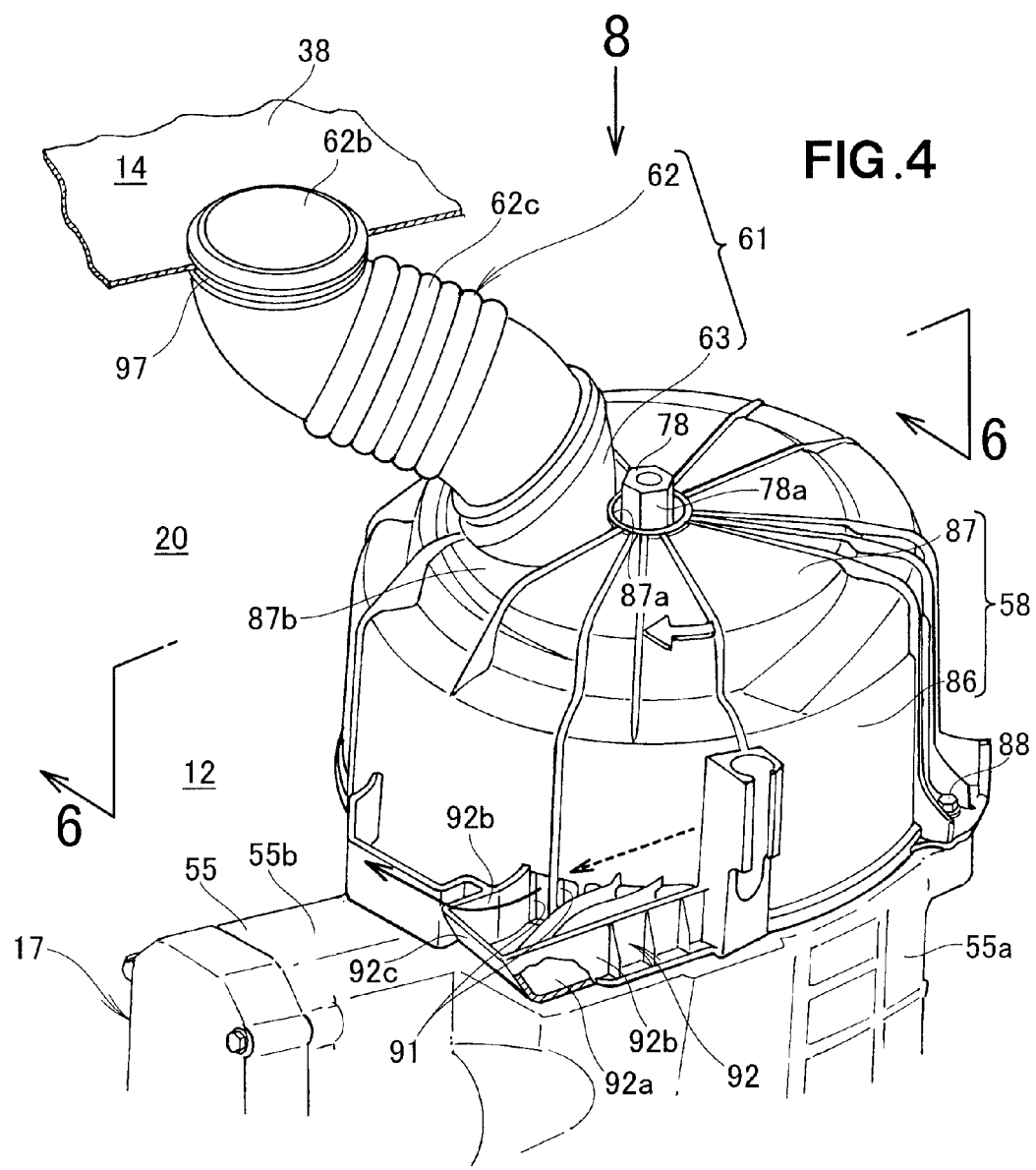
FIG. 4 is a perspective view showing a fan cover and a ventilation-introducing channel of the cogeneration apparatus according to the present invention.

As shown in FIG. 4, the intake/exhaust part 14 communicates with the power-generation compartment 12 through a ventilation-introducing channel 61 and a fan cover 58, which are described hereinafter. The air that is led to the intake/exhaust part 14 can therefore be led through the ventilation-introducing channel 61 and the fan cover 58 to the power-generation compartment 12. An electrical-equipment compartment 20 is formed from the combined spaces of the first electrical-equipment compartment 13, the second electrical-equipment compartment 15, and the intake/exhaust part 14. The electrical-equipment compartment 20 communicates with the exterior 40 (FIG. 3) of the cogeneration case 11 through the outside-air-introducing part 42.

The power-generation compartment 12 communicates with the exhaust inlet 46a of the exhaust passage 46 provided to the lower sub-sidepanel 45, as shown in FIG. 3. The exhaust passage 46 communicates with the exterior 40 of the cogeneration case 11 through the exhaust outlet 46b. In other words, the power-generation compartment 12 communicates with the exterior 40 of the cogeneration case 11 through the exhaust passage 46. The air that is led to the power-generation compartment 12 can therefore be led from the exhaust inlet 46a to the interior of the exhaust passage 46, and the air that is led to the interior of the exhaust passage 46 can be led through the exhaust outlet 46b to the exterior 40 of the cogeneration case 11.

The engine 16, the electrical generator 18, the heat exchanger 19, and a first muffler 54, which constitutes a part of an exhaust system 51 of the engine 16, are accommodated in the power-generation compartment 12, as shown in FIGS. 1 and 2. The first control part 21 and the power converter part 22 are accommodated in the first electrical-equipment compartment 13. An air-cleaning device 45, which constitutes a part of an intake system 41 of the engine 16, a device for adjusting gas flow volume, and a mixer (including a throttle valve) are disposed in the intake/exhaust part 14.

A second muffler 52 that constitutes a part of the exhaust system 51 of the engine 16 is also disposed in the intake/exhaust part 14. An outlet of the first muffler 54 communicates with an inlet of the second muffler 52, and an exhaust outlet communicates with an outlet 52a of the second muffler 52. The exhaust outlet is provided to the roof panel of the cogeneration case 11. The second control part 23 and the like are accommodated in the second electrical-equipment compartment 15.

The engine 16 is provided with the body 17 of the engine 16, the intake system 41, the exhaust system 51, and the ventilation-introducing channel 61 (see also FIG. 4). The ventilation-introducing channel 61 is provided with a first ventilation-introducing channel 62 and a second ventilation-introducing channel 63.

The engine 16 is a gas engine that is provided with the outside-air-introducing part 42 provided to the intake system 41, the air-cleaning device 45 provided downstream of the outside-air-introducing part 42, a device for adjusting gas flow volume provided downstream of the air-cleaning device 45, a mixer provided downstream of the device for adjusting gas flow volume, and a throttle valve included in the mixer.

The outside-air-introducing part 42 has an intake site 42a for guiding a part of the air (outside air) to the intake system 41, and a ventilation/cooling site 42b for guiding the remainder of the air (outside air) for use in ventilation. The intake site 42a guides to the intake system 41 a part of the air introduced from the exterior 40 of the cogeneration case 11 (outside air). The ventilation/cooling site 42b guides for use in ventilation the remainder of the air introduced from the exterior 40 of the cogeneration case 11 (outside air).

The engine body 17 is a so-called "vertical engine," in which a crankshaft 48 (see FIG. 6) is provided vertically. In the engine body 17, an oil tank 56 is provided to a lower part of a crank part 55a in an engine block 55, a ventilation fan (ventilation/cooling fan) 57 is provided to the region above the crank part 55a, and the ventilation fan 57 is covered by the fan cover 58. The electrical generator 18 is provided between the crank part 55a and the ventilation fan 57.

Figure 5:
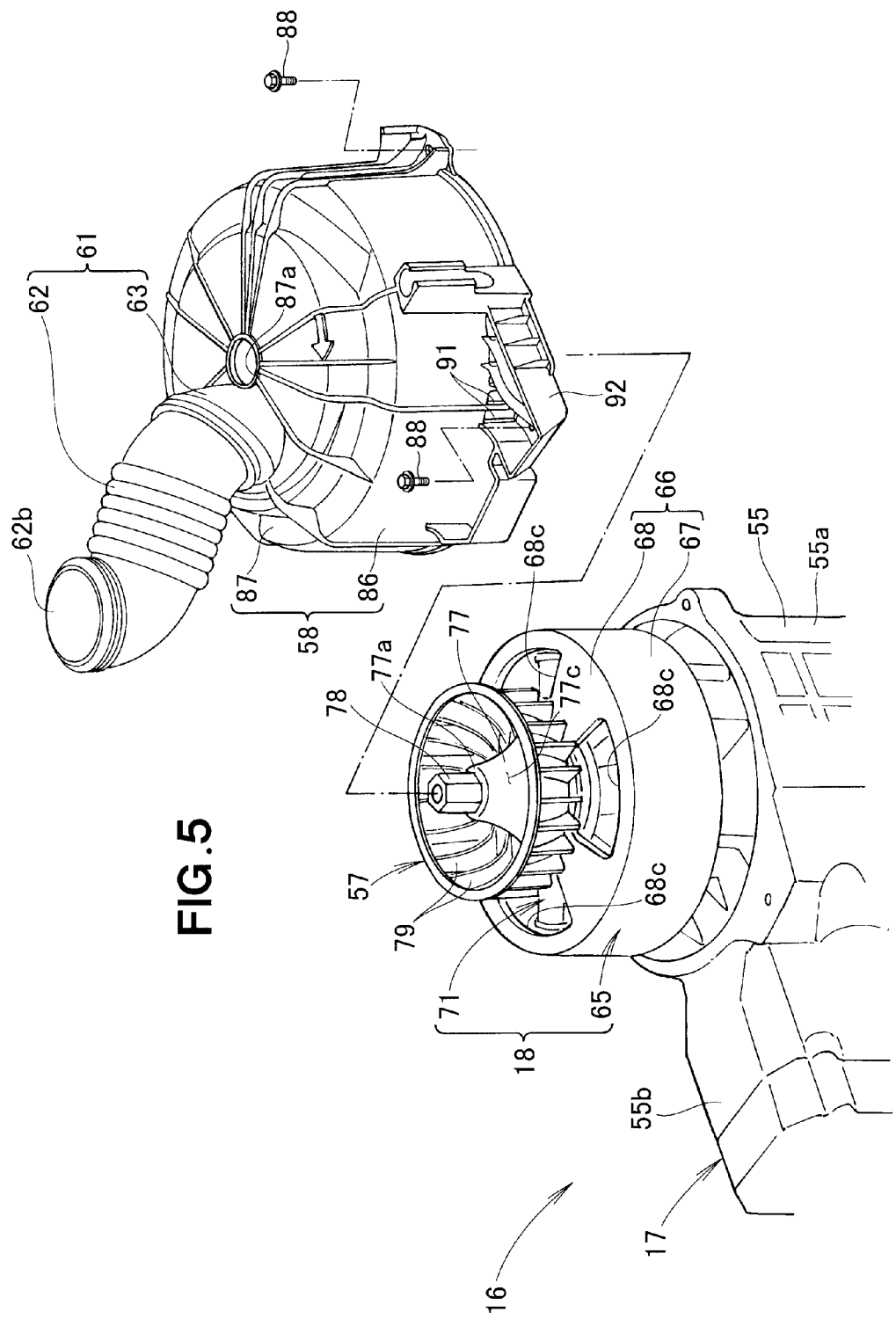
FIG. 5 is an exploded perspective view showing the fan cover and the ventilation-introducing channel of FIG. 4, removed from an engine block.
Figure 6:
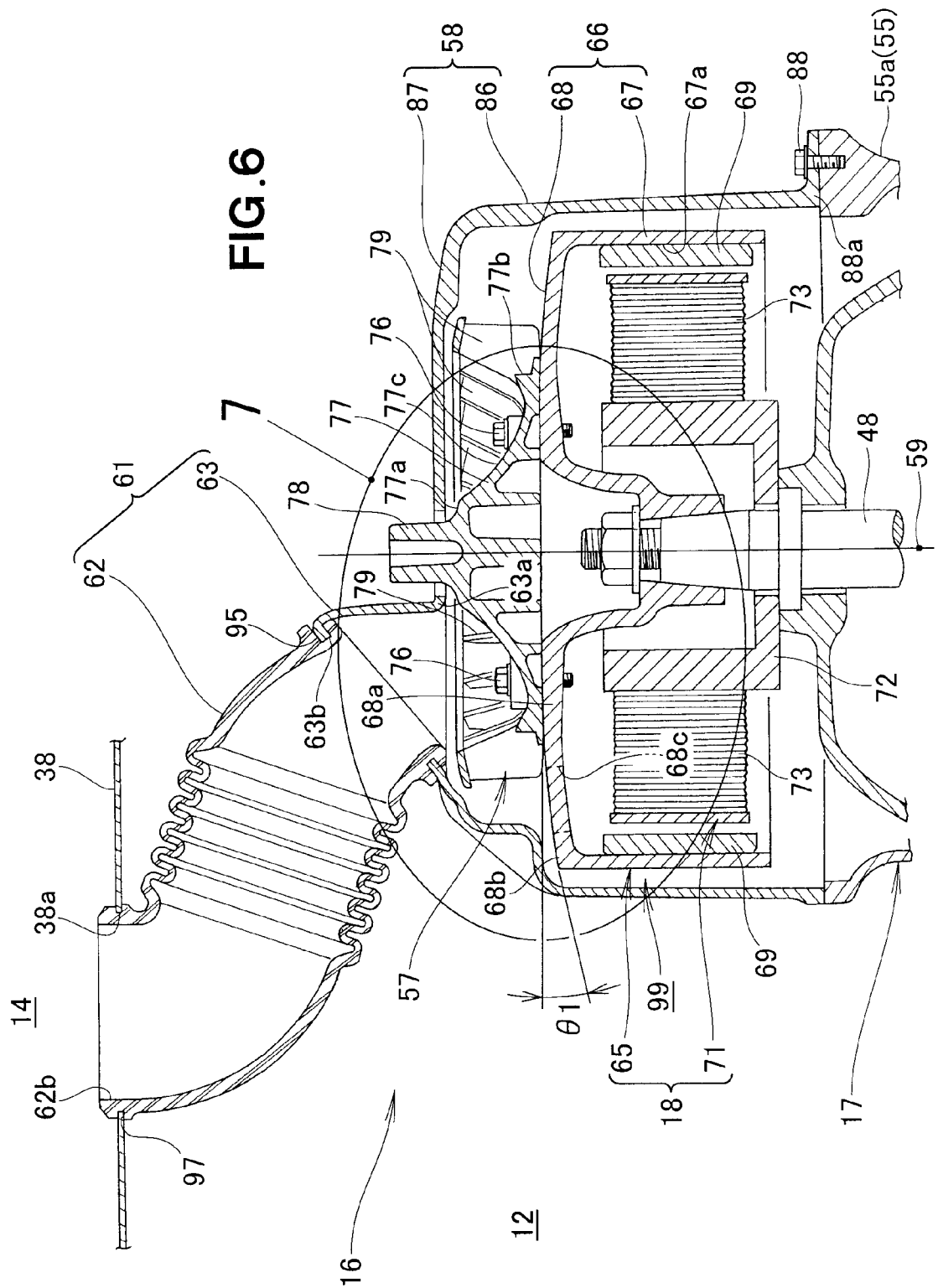
FIG. 6 is a cross-sectional view taken along line 6-6 of FIG. 4.

The electrical generator 18 is provided to an upper part of the engine body 17 and is covered by the ventilation fan 57 and the fan cover 58, as shown in FIGS. 5 and 6. The electrical generator 18 is provided with a rotor 65, which is linked to the crankshaft 48 of the engine body 17 (engine 16), and a stator 71, which is accommodated within the rotor 65. The engine 16 is therefore driven, and the crankshaft 48 is made to rotate, whereby the rotor 65 can be made to rotate by the crankshaft 48. The rotation of the rotor 65 allows electrical power (alternating-current power) to be generated by the electrical generator 18.

The rotor 65 is provided with a cylinder 66, in which a cylindrical circumferential wall 67 is obstructed by a top part 68, and a permanent magnet 69, which is provided at a predetermined interval from an internal circumference 67a of the cylinder 66 (circumferential wall 67). In the cylinder 66, the top part 68 is formed having a downward slant from a center part 68a to a circumferential edge 68b at an inclination angle $\theta 1$, and a plurality of aperture parts 68c is formed facing in the circumferential direction at predetermined intervals.

The stator 71 is accommodated within the rotor 65 and is provided with a stator pedestal 72, which is provided to the crank part 55a in the engine block 55, and a coil 73, which is wrapped around the stator pedestal 72.

The ventilation fan 57 is provided in the region above the electrical generator 18 on a co-axis 59 with respect to the crankshaft 48. The ventilation fan 57 is provided with a fan base 77 that is attached to the top part 68 of the rotor 65 on the co-axis 59 by a plurality of bolts 76, an adjustment boss 78 provided to a top part 77a of the fan base 77, and a plurality of blade parts 79 that are provided at predetermined intervals along an external circumferential edge 77b of the fan base 77. The ventilation fan 57 is a so-called "sirocco fan," in which the plurality of the blade parts 79 is provided to an annular shape.

Figure 7:
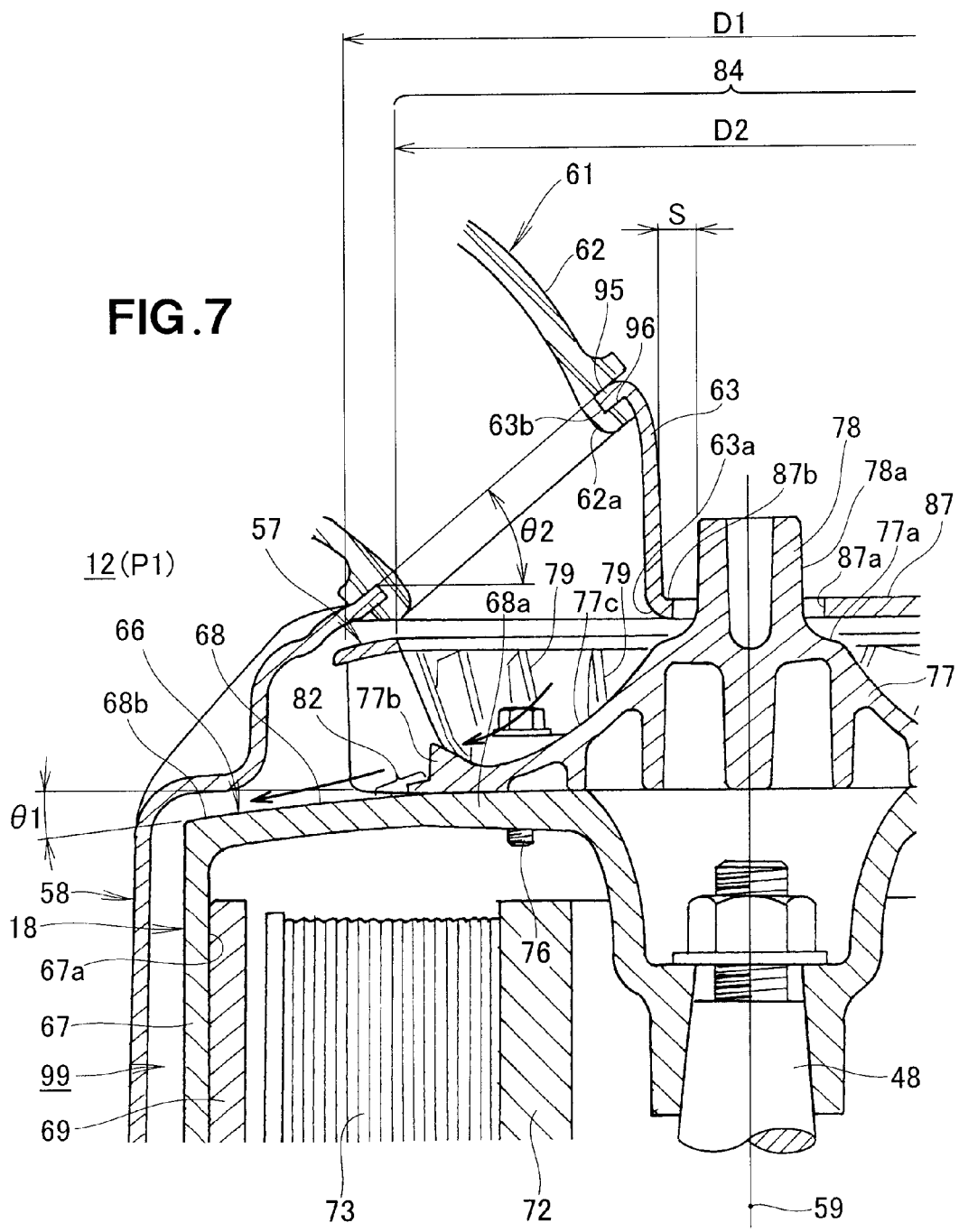
FIG. 7 is an enlarged view of area 7 of FIG. 6.

As shown in FIG. 7, the fan base 77 is formed substantially as a circular truncated cone, and an inclined wall surface 77c is formed in a concave bent shape so as to slant downward from the vicinity of the center part toward the top part 68 of the cylinder 66. Forming the inclined wall surface 77c in a concave bent shape and forming the top part 68 of the cylinder 66 to slant downward at the inclination angle $\theta 1$ allows a border part 82 of the top part 68 of the cylinder 66 and the inclined wall surface 77c to be kept smooth. The inclined wall surface 77c and the top part 68 are therefore formed into an inclined surface substantially composed of a single plane. It is thereby possible for air led to the interior of the ventilation fan 57 to be smoothly led past the inclined wall surface 77c of the fan base 77 to the top part 68 of the cylinder 66.

The adjustment boss 78 is provided to the top part 77a of the fan base 77. The adjustment boss 78 protrudes upward from the top part 77a of the fan base 77 and is provided on the co-axis 59 with respect to the crankshaft 48. The adjustment boss 78 protrudes upward from a cover aperture 87a of the fan cover 58, which is described hereinafter, and an external circumference 78a (see FIG. 8) is formed in a hexagonal shape. An offset wrench 83 (see FIG. 12) or other tool can therefore engage with the adjustment boss 78, and the offset wrench 83 can be used to rotate the adjustment boss 78 (i.e., the ventilation fan 57). Turning the ventilation fan 57 allows the rotor 65 of the electrical generator 18 to be turned. Turning the rotor 65 allows the crankshaft 48 to be turned. Turning the crankshaft 48 moves and positions a piston at top dead center. The gap between the valve shafts and the rocker arms (i.e., the tappet clearance) can be adjusted in a state in which the piston is positioned at top dead center, and the intake valve and the exhaust valve are closed.

The plurality of the blade parts 79 is provided at predetermined intervals along the external circumferential edge 77b of the fan base 77. The plurality of the blade parts 79 is formed in an annular shape so as to have a fan outside diameter D1 and a fan inside diameter D2. The space inside the fan outside diameter D1 is therefore an intake part 84 of the ventilation fan 57.

The ventilation fan 57 and the electrical generator 18 are covered from above by the fan cover 58, as shown in FIGS. 4 and 6. The fan cover 58 is provided with a tubular circumferential cover wall 86, which is formed in a cylindrical shape, and a disk-shaped lid part 87, which is provided to an upper part of the circumferential cover wall 86.

A bottom part 86a of the circumferential cover wall 86 is attached to the crank part 55a of the engine block 55 by a plurality of bolts 88. The circumferential cover wall 86 is provided with a cover outlet 91, which opens towards a cylinder part 55b of the engine block 55, and a guide part 92, which protrudes from the cover outlet 91 along the cylinder part 55b.

Figure 8:
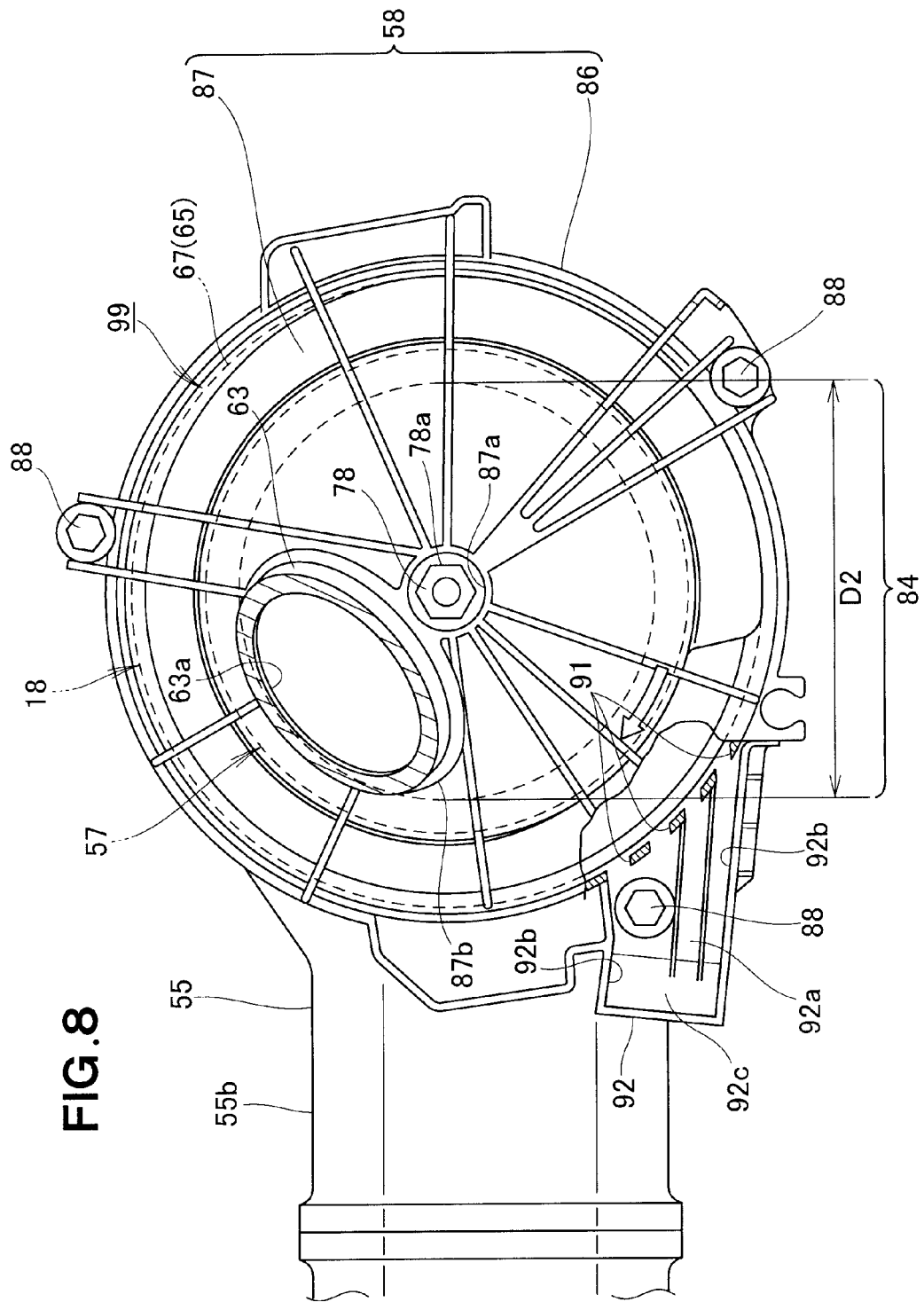
FIG. 8 is a view as seen in the direction of arrow 8 of FIG. 4.

As shown in FIGS. 4 and 8, the cover outlet 91 is an aperture for leading to the exterior (i.e., power generation compartment 12) of the fan cover 58 air that has been led to the interior of the fan cover 58. As described hereinafter, the air that has been led to the interior of the fan cover 58 is led from an upper part to a lower part of the rotor 65 in a helical fashion through a space 99 (see also FIG. 7) between the circumferential wall 67 of the rotor 65 and the circumferential cover wall 86 of the fan cover 58. The cover outlet 91 is therefore provided to a position that allows air to be smoothly led out upward along the cylinder part 55b, where this air has been led in a helical fashion to a lower part of the rotor 65.

The guide part 92 protrudes from the cover outlet 91 along the cylinder part 55b in a direction tangential to the circumferential cover wall 86 (i.e., in the direction of flow of the air that has been led from the cover outlet 91 to the exterior of the fan cover 58) and is thereby provided to a region above the cylinder part 55b. The guide part 92 has a bottom part 92a that extends from the cover outlet 91 along the cylinder part 55b, a pair of wall parts 92b that protrude from both sides of the bottom part 92a, and a forward-inclined wall part 92c that extends in an upward inclination from a forward end part of the bottom part.

Air that has been led out from the cover outlet 91 to the exterior of the fan cover 58 can therefore be smoothly guided along the cylinder part 55b to the forward-inclined wall part 92c by the bottom part 92a. The air that has been guided to the forward-inclined wall part 92c can also be guided by the forward-inclined wall part 92c toward the region inclined upward from the cylinder part 55b.

The cover outlet 91 is provided lower than the exhaust inlet 46a of the exhaust passage 46, as shown in FIG. 3. The air that is heated in the periphery of the engine body 17 and the heat exchanger 19 rises due to convection, as described above.

Accordingly, providing the cover outlet 91 lower than the exhaust inlet 46a allows the air led out from the cover outlet 91 to the power-generation compartment 12 (cooling air flow) to be guided at an upward incline toward the exhaust inlet 46a. The air that has risen to the region above the engine body 17 and the heat exchanger 19 can accordingly be guided to the exhaust inlet without being unnecessarily disturbed by the air led out from the cover outlet 91 (cooling air flow). The air that is heated in the periphery of the engine body 17 and the heat exchanger 19 is therefore efficiently led out (exhausted) from the power-generation compartment 12 by the cooling air flow, and the power-generation compartment 12 can be properly cooled.

The disk-shaped lid part 87 is provided to the upper part of the circumferential cover wall 86, as shown in FIGS. 4 and 8. In the lid part 87, the cover aperture 87a is formed in the center, and the second ventilation-introducing channel 63 is integrally provided to an offset site 87b that is removed from the cover aperture 87a toward the outside in the radial direction. The cover aperture 87a allows the adjustment boss 78 to protrude upward.

As shown in FIGS. 7 and 8, in the second ventilation-introducing channel 63, a second channel outlet (channel outlet) 63a opens at the offset site 87b, and a second channel inlet 63b opens in an inclined state at an inclination angle $\theta 2$ with respect to the lid part 87. Opening the second channel outlet 63a at the offset site 87b allows the second channel outlet to open against the intake part 84 of the ventilation fan 57. Providing the second channel outlet 63a of the second ventilation-introducing channel 63 to the offset site 87b allows the second ventilation-introducing channel 63 (the second channel outlet 63a) to be removed from the adjustment boss 78. A gap S between the second ventilation-introducing channel 63 and the adjustment boss 78 can therefore be ensured.

Ensuring the gap S between the second ventilation-introducing channel 63 and the adjustment boss 78 allows the offset wrench 83 (see FIG. 12) or other tool to be engaged with the adjustment boss 78 and allows the adjustment boss 78 to be turned. Turning the adjustment boss 78 turns the crankshaft 48 and positions the piston at top dead center. In this state, the intake valve and the exhaust valve are closed, and the gap between the valve shafts and the rocker arms (i.e., the tappet clearance) can be readily adjusted.

The second channel outlet 63a is formed in an elliptical shape so as to lengthen toward the circumferential direction of the lid part 87 at the position against the intake part 84 of the ventilation fan 57. Forming the second channel outlet 63a in an elliptical shape allows a larger size to be ensured in comparison to forming the cross-sectional area into a circular shape. An adequately large volume of air introduced to the intake part 84 of the ventilation fan 57 from the second channel outlet 63a can therefore be ensured.

Placing the second channel outlet 63a against the intake part 84 of the ventilation fan 57 allows air to be led smoothly (i.e., in a state in which pressure losses are limited) from the second channel outlet 63a to the intake part 84. The internal pressure within the fan cover 58 can therefore be kept at a level higher than an internal pressure P1 of the power-generation compartment 12. It is thereby possible for the air within the fan cover 58 to be smoothly exhausted to the power-generation compartment 12.

The cover aperture 87a is formed so that the interval from the adjustment boss 78 is small. The interval between the cover aperture 87a of the adjustment boss 78 is therefore limited to a small size. It is thereby possible for the air that is introduced to the intake part 84 of the ventilation fan 57 from the second channel outlet 63a to be prevented from flowing out from the gap between the cover aperture 87a and the adjustment boss 78.

An engagement piece 95 that is extended to the inside is provided to the second channel inlet 63b. The first ventilation-introducing channel 62 is linked to the engagement piece 95. The first ventilation-introducing channel 62 has a first channel outlet 62a that can engage with the second channel inlet 63b, a first channel inlet (channel inlet) 62b (FIGS. 4 and 6) that can engage with the upper dividing part 38, and a site 62c that is formed into a bellows configuration and can thereby undergo elastic deformation.

The first channel outlet 62a opens in a state inclined at the inclination angle θ2 in the same manner as the second channel inlet 63b. An annular lower engagement groove 96 is formed on the outer circumference of the first channel outlet. The lower engagement groove 96 is fit to the engagement piece 95 of the second channel inlet 63b. It is thereby possible for the first ventilation-introducing channel 62 to communicate with the second ventilation-introducing channel 63 through the first channel outlet 62a and the second channel inlet 63b.

An annular upper engagement groove 97 is formed on the outer circumference of the first channel inlet 62b, as shown in FIGS. 4 and 6. The upper engagement groove 97 can fit into a ventilation hole 38a of the upper dividing part 38. Fitting the upper engagement groove 97 to the ventilation hole 38a allows the first channel inlet 62b to open into the intake/exhaust part 14. Opening the first channel inlet 62b into the intake/exhaust part 14 allows the first ventilation-introducing channel 62 to communicate with the intake/exhaust part 14.

The intake/exhaust part 14 therefore communicates with the interior of the fan cover 58 by the ventilation-introducing channel 61 (i.e., the second ventilation-introducing channel 63 and the first ventilation-introducing channel 62). The ventilation fan 57 and the electrical generator 18 are housed within the fan cover 58. In other words, the intake/exhaust part 14 communicates via the ventilation-introducing channel 61 with the ventilation fan 57 and the electrical generator 18 within the fan cover 58. Driving the ventilation fan 57 can thereby draw air from the intake/exhaust part 14 and lead the air to the electrical generator 18. Driving the ventilation fan 57 further allows the air within the cogeneration case 11 to be ventilated.

The first channel inlet 62b of the ventilation-introducing channel 61 has a cross-sectional channel area S1, and the second channel outlet 63a of the ventilation-introducing channel 61 has a cross-sectional channel area S2. The cross-sectional channel area S1 of the first channel inlet 62b and the cross-sectional channel area S2 of the second channel outlet 63a are set to a fixed value (i.e., S1=S2). It is thereby possible for pressure losses in the air that flows through the ventilation-introducing channel 61 to be minimized when the air in the intake/exhaust part 14 is led through the ventilation-introducing channel 61 to the power-generation compartment 12.

The first channel inlet 62b of the ventilation-introducing channel 61 is provided higher than the second channel outlet 63a of the ventilation-introducing channel 61. The ventilation fan 57 is provided to the region below the second channel outlet 63a. The air that flows into the ventilation fan 57 can therefore be smoothly led from higher to lower until reaching the ventilation fan 57. It is thereby possible for pressure losses to be minimized when air (cooling air flow) is led to the ventilation fan 57.

In the intake system 41, air (outside air) taken in from the outside-air-introducing part 42 is led through the first air-introducing channel 43 to the air-cleaning device 45, as shown in FIGS. 1 and 2. The air that is led to the air-cleaning device 45 is purified by the air-cleaning device 45, and the purified air passes through the device for adjusting gas flow volume and is mixed with gaseous fuel by the mixer. The mixed gaseous fuel is introduced through the throttle valve and an inlet hose to the interior of a combustion chamber of the cylinder part 55b, and the engine 16 is driven by the gaseous fuel introduced to the interior of the combustion chamber.

The exhaust system 51 is provided with the first muffler 54, which is accommodated in the power-generation compartment 12, and the second muffler 52, which is accommodated in the intake/exhaust part 14. The inlet of the first muffler 54 communicates with the combustion chamber of the cylinder part 55b, and the outlet of the first muffler 54 communicates with the second muffler 52. An outlet 52a of the second muffler 52 communicates with the exhaust outlet. Exhaust gas that is exhausted from the combustion chamber of the cylinder part 55b is led through the first muffler 54 to the second muffler 52, and the exhaust gas that is led to the second muffler 52 is led through the exhaust outlet to the exterior of the cogeneration case 11.

Exhaust gas of the engine 16 is led to the heat exchanger 19 along with outside water, which is led as shown by arrow Wa. A heat exchange takes place between the exhaust gas and the water, whereby the temperature of the water increases. The waste heat of the engine 16 is thus used as a heat source, hot water is generated, and the heat of hot water that was generated is led to the exterior of the cogeneration apparatus 10 as shown by arrow Hw and is used for space heating and the like.

The first control part 21 is made to control the engine 16, is provided to substantially the lower-half part of the left dividing wall 36, and is thereby disposed in the first electrical-equipment compartment 13. The first control part 21 used is, e.g., an earth leakage breaker. The earth leakage breaker used as the first control part 21 is provided with circuit-breaking functionality and thereby prevents overcurrent, short-circuiting, and earth leakage in the electrical generator 18. In other words, overcurrent, short-circuiting, and earth leakage in the electrical generator 18 are detected by the first control part 21, and the engine 16 is stopped (controlled) by the first control part 21, whereby overcurrent, short-circuiting, and earth leakage in the electrical generator 18 can be prevented.

The power converter part 22 is provided to the upper-half part of the left dividing wall 36 and is thereby disposed in the first electrical-equipment compartment 13. The power converter part 22 is an inverter unit for converting the alternating-current power produced by the electrical generator 18 to electrical power of the desired format.

The second control part 23 is an ECU provided with functions such as controlling the engine 16 so that the electrical generator 18 is switched to starter functionality when starting the engine 16, and so that the electrical generator 18 is switched to generator functionality after the engine 16 has started.

An example of ventilating the interior of the cogeneration apparatus 10 and cooling the electrical generator 18 will be described next with reference to FIGS. 9 through 11.

Figure 9A:
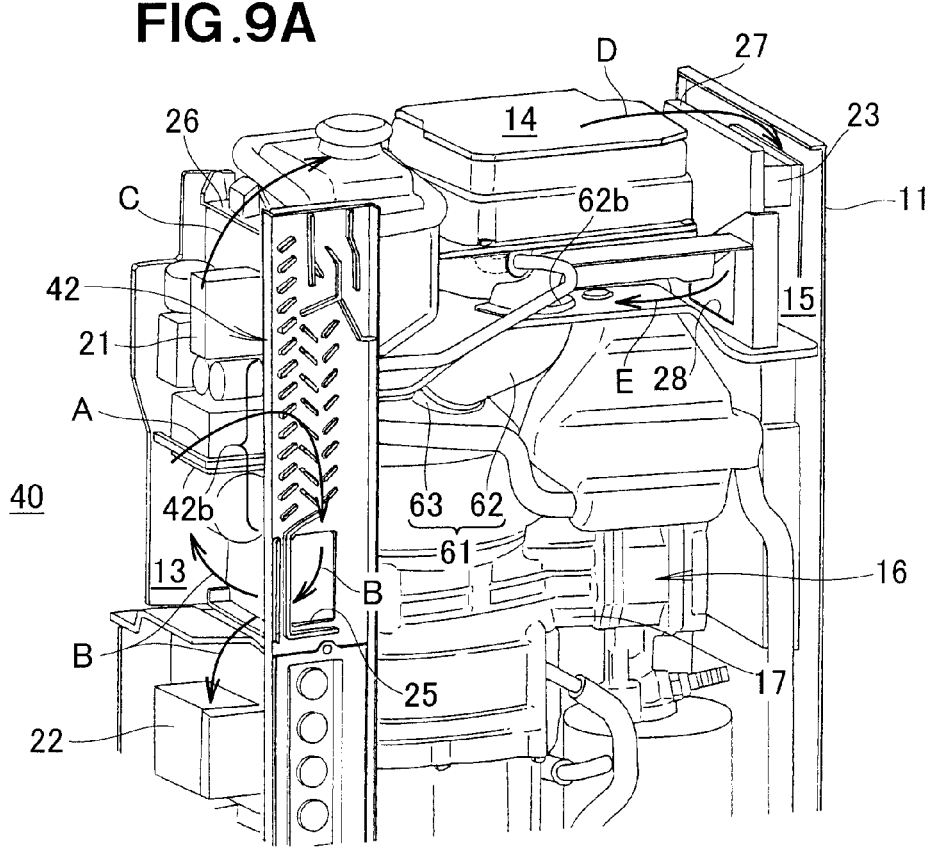
FIGS. 9A and 9B are views illustrating an example of cooling electrical components in an electronics-housing part and ventilating the interior of the electronics-housing part.

The engine 16 is driven, and the ventilation fan 57 (FIG. 6) is driven, as shown in FIG. 9A. Driving the ventilation fan 57 causes outside air to be introduced from the exterior (atmosphere) 40 of the cogeneration case 11 to the ventilation/cooling site 42b of the outside-air-introducing part 42 as shown by arrow A.

The air (outside air) that is led to the ventilation/cooling site 42b of the outside-air-introducing part 42 is led through the first communicating aperture 25 to the first electrical-equipment compartment 13 as shown by arrow B. Leading the air to the first electrical-equipment compartment 13 causes the electrical components (specifically, the first control part 21 and the power converter part 22) to be cooled by the air led in. The air that has cooled the first control part 21 and the power converter part 22 is led through the second communicating aperture 26 to the upper part of the intake/exhaust part 14, as shown by arrow C.

The air led to the intake/exhaust part 14 is led through the third communicating aperture 27 to the second electrical-equipment compartment 15 as shown by arrow D. Leading the air to the second electrical-equipment compartment 15 causes the electrical equipment (specifically, the second control part 23) to be cooled by the air led in. The air that has cooled the second control part 23 is led through the fourth communicating aperture 28 to the lower part of the intake/exhaust part 14 as shown by arrow E.

Leading the air to the first electrical-equipment compartment 13 thus cools the first control part 21 and the power converter part 22 and allows the interior of the first electrical-equipment compartment 13 to be ventilated. Leading the air to the second electrical-equipment compartment (electrical-equipment compartment) 15 cools the second control part 23 and allows the interior of the second electrical-equipment compartment 15 to be ventilated.

Figure 9B:
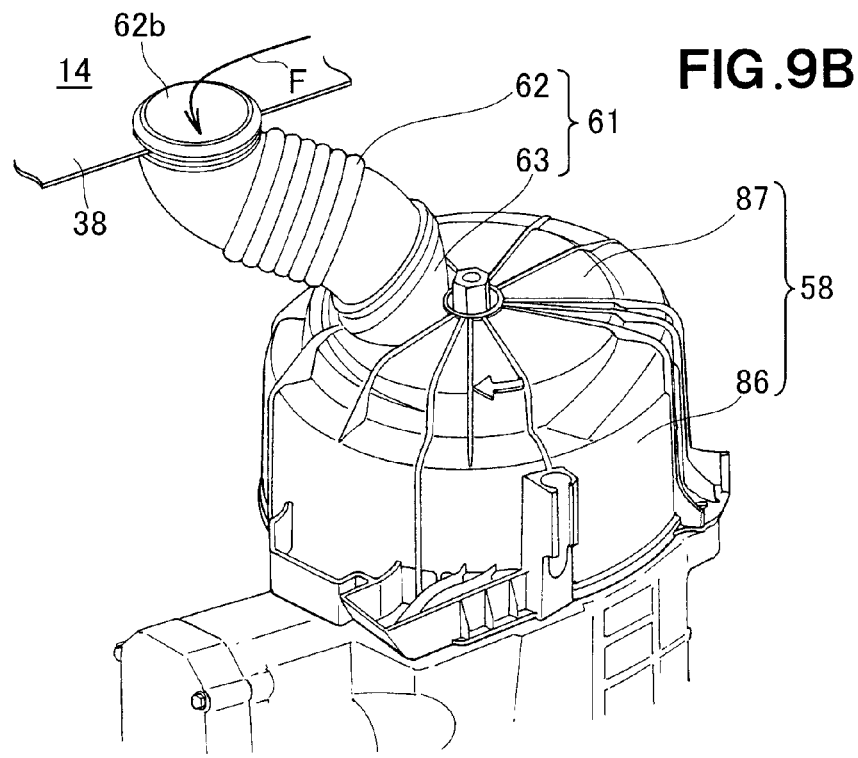

As shown in FIG. 9B, the air led to the lower part of the intake/exhaust part 14 is led through the first channel inlet 62b (see also FIG. 9A) of the ventilation-introducing channel 61 (specifically, the first ventilation-introducing channel 62) to the interior of the ventilation-introducing channel 61, as shown by arrow F.

As shown in FIG. 10A, the air led to the interior of the ventilation-introducing channel 61 is led through the ventilation-introducing channel 61 to the interior of the fan cover 58, as shown by arrow G. The air led to the interior of the fan cover 58 is led through the ventilation fan 57 to the electrical generator 18. Specifically, the air is led along the inclined wall surface 77c of the ventilation fan 57 and the top part 68 of the rotor 65 toward the circumferential edge 68b of the top part 68, as shown by arrow H. The air led to the circumferential edge 68b of the top part 68 is led to the space 99 between the circumferential wall 67 of the rotor 65 and the circumferential cover wall 86 of the fan cover 58, as shown by arrow I. A part of the air led along the inclined wall surface 77c of the ventilation fan 57 and the top part 68 of the rotor 65 as shown by arrow H is led from the aperture parts 68c of the top part 68 to the interior of the electrical generator 18, as shown by arrow J (see also FIG. 10B).

As shown in FIG. 10B, the rotor 65 rotates as shown by arrow K. The air led to the space 99 (FIG. 10A) from the upper side (the circumferential edge 68b) of the rotor 65 is therefore led in a helical fashion along the circumferential wall 67 toward a lower part 67b of the circumferential wall 67 by the rotation of the rotor 65, as shown by arrow L. The air is thus led in a helical fashion along the circumferential wall 67, and the air is led from the aperture parts 68c of the top part 68 to the interior of the electrical generator 18, whereby the electrical generator 18 can be efficiently cooled. The air that is led in a helical fashion along the circumferential wall 67 is led to the lower part 67b of the circumferential wall 67.

Meanwhile, the air led from the aperture parts 68c of the top part 68 to the interior of the electrical generator 18 is led through the lower part 67b of the circumferential wall 67 to the exterior of the electrical generator 18, as shown by arrow M. The air led along the circumferential wall 67 in a helical fashion to the lower part 67b of the circumferential wall 67 and the air led through the lower part 67b of the circumferential wall 67 to the exterior of the electrical generator 18 are led to the cover outlet 91.

Figure 11A:
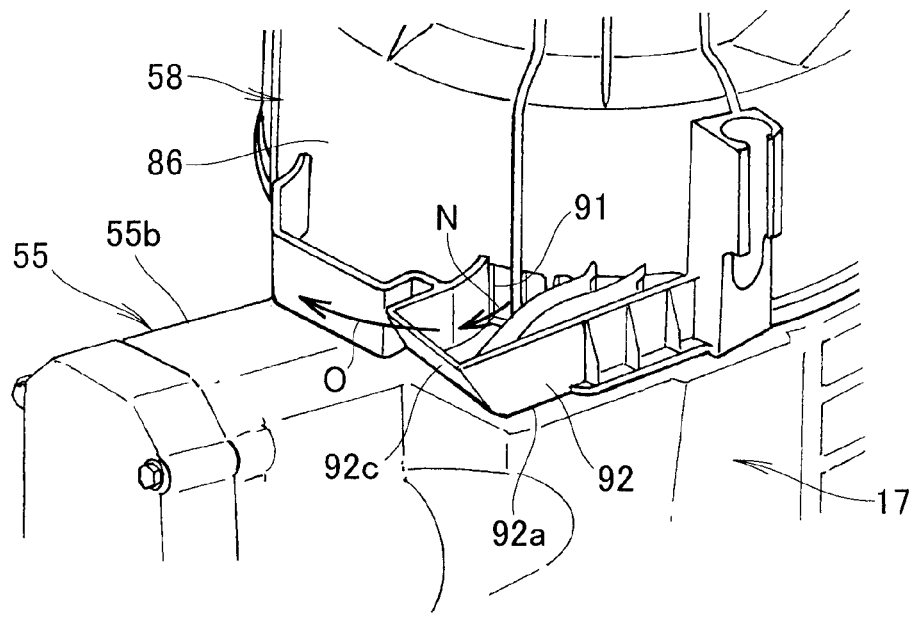
FIGS. 11A and 11B are views illustrating an example of cooling an engine in a generator-housing part and example ventilating the interior of the generator-housing part.

As shown in FIG. 11A, the air led to the cover outlet 91 is led through the cover outlet 91 from the interior of the fan cover 58 to the guide part 92. The air led to the guide part 92 is guided along the bottom part 92a to the forward-inclined wall part 92c. The air guided to the forward-inclined wall part 92c is guided by the forward-inclined wall part 92c toward the region inclined upward from the cylinder part 55b and is led to the power-generation compartment 12 (FIG. 4), as shown by arrow O.

Figure 11B:
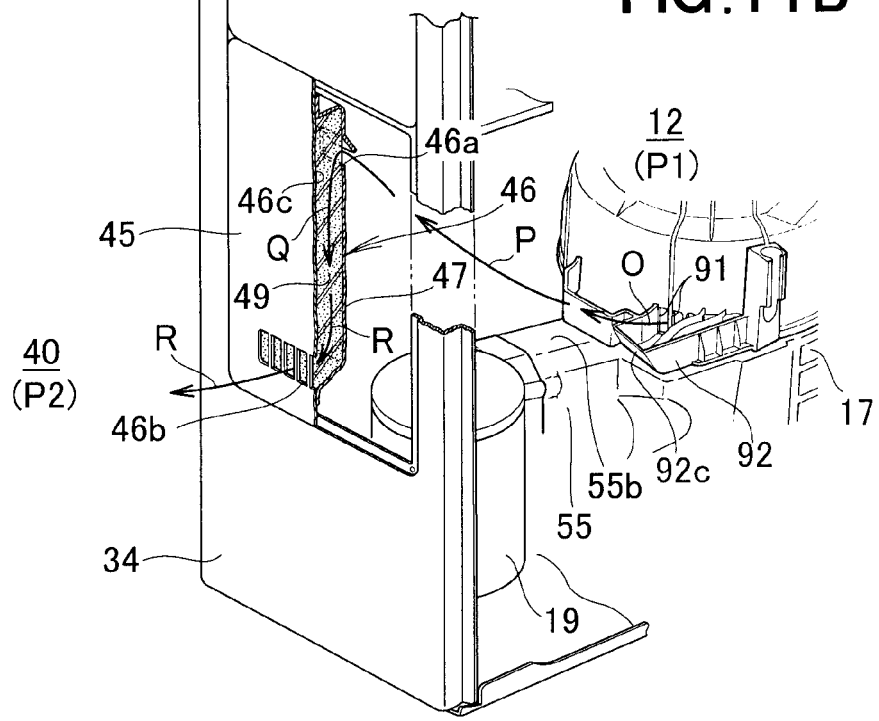

As shown in FIG. 11B, the cover outlet 91 is provided lower than the exhaust inlet 46a of the exhaust passage 46. The exhaust inlet 46a is provided higher than the engine body 17 and the heat exchanger 19. The air that flows out from the cover outlet 91 to the power-generation compartment 12 as shown by arrow O (cooling air flow) is accordingly guided through the region above the engine body 17 (the cylinder part 55b) and the heat exchanger 19 in an upward-inclined direction toward the exhaust inlet 46a, as shown by arrow P.

The air heated in the periphery of the engine body 17 (particularly the cylinder part 55b) and the heat exchanger 19 rises due to convection. The air that rises to the region above the cylinder part 55b and the heat exchanger 19 can therefore be led to the exhaust inlet 46a as shown by arrow P without being unnecessarily disturbed by the air led out from the cover outlet 91 (cooling air flow). It is thereby possible for the air that has risen to the region above the cylinder part 55b and the heat exchanger 19 to be efficiently led to the exhaust inlet 46a while being carried along with the flow of the air led out from the cover outlet 91 (cooling air flow). The air led to the exhaust inlet 46a (including the air heated in the periphery of the engine body 17 and the heat exchanger 19) is led through the exhaust inlet 46a to the exhaust passage 46, as shown by arrow Q.

The air led to the exhaust passage 46 is led through the sound-absorbing material 49 to the exhaust outlet 46b. The air led to the exhaust outlet 46b is led through the exhaust outlet 46b to the exterior (atmosphere) 40 of the cogeneration case 11, as shown by arrow R. The air heated in the periphery of the engine body 17 and the heat exchanger 19 is thus efficiently exhausted from the power-generation compartment 12 by the cooling air flow, whereby the power-generation compartment 12 can be properly cooled.

The sound-absorbing material 49 is provided to the space 46c of the exhaust passage 46. The noise of the power-generation compartment 12 (i.e., the noise accompanying ventilation of the ventilation fan 57) can therefore be absorbed by the sound-absorbing material 49. It is thereby possible for the fan noise accompanying ventilation of the ventilation fan 57 to be even more favorably reduced.

As described in FIGS. 9 through 11, the air introduced from the exterior of the cogeneration case 11 is used first to cool the electrical equipment (the first control part 21, the second control part 23, and the power converter part 22), next to cool the electrical generator 18, and then to cool the engine 16, whereby cooling can be performed efficiently with preference given to devices having high cooling priority. The air introduced from outside the cogeneration case 11 (ventilating air flow) can be limited to an appropriate volume, and the size of the ventilation fan 57 need not be increased in order to ensure a large volume of air flow for ventilation. It is thereby possible for the noise resulting from driving the ventilation fan 57 (i.e., the noise accompanying ventilation) to be reduced. Limiting increases in the size of the ventilation fan 57 also prevents the pulling of more heat than necessary from the engine 16 and the heat exchanger 19 (see FIG. 1), allows hot water to be properly generated using the waste heat of the engine 16 efficiently as a heat source.

Limiting increases in the size of the ventilation fan 57 shown in FIG. 5 makes it possible to reduce electrical power used when driving the ventilation fan 57 (electrical driving power). Lessening the electrical driving power of the ventilation fan 57 thus allows the efficiency of electricity generation of the electrical generator 18 to be increased.

In the cogeneration apparatus described in the prior art, the aperture part is provided to the dividing-wall part for partitioning the electrical-equipment compartment and the power-generation compartment, and the ventilation fan is provided to the aperture part. The noise when driving the motor therefore readily leaks through the ventilation fan to the exterior of the housing, and excessive noise-preventing measures and noise-absorbing measures are needed.

In contrast, in the cogeneration apparatus 10 according to the present embodiment, the ventilation-introducing channel 61 is interposed between the electrical-equipment compartment 20 (i.e., the first electrical-equipment compartment 13, the second electrical-equipment compartment 15, and the intake/exhaust part 14) and the ventilation fan 57 (FIG. 5). It is therefore possible to inhibit the noise when driving the engine 16 from leaking through the ventilation fan 57 to the exterior of the cogeneration case 11. It is thereby possible to obviate excessive noise-preventing measures and noise-absorbing measures as in the cogeneration apparatus of the prior art.

The air led from the second channel outlet 63a of the ventilation-introducing channel 61 to the interior of the fan cover 58 is used to cool the electrical generator 18, and is thereafter led out from the interior of the fan cover 58 to the power-generation compartment 12. The air introduced into the power-generation compartment 12 can therefore be used to cool the engine 16 (particularly the cylinder part 55b) of the power-generation compartment 12.

Leading the air out from the interior of the fan cover 58 to the power-generation compartment 12 allows the internal pressure P1 of the power-generation compartment 12 to be kept higher than an external pressure P2 of the exterior 40 of the cogeneration case 11 (i.e., the internal pressure P1 of the power-generation compartment 12 is kept positive). It is thereby possible for the air led out to the power-generation compartment 12 to be smoothly exhausted to the exterior 40 of the cogeneration case 11.

Smoothly exhausting the air in the power-generation compartment 12 to the exterior 40 of the cogeneration case 11 allows temperature increases of the power-generation compartment 12 to be limited and allows the temperature of the power-generation compartment 12 to be kept at a proper level. Keeping the temperature of the power-generation compartment 12 at a proper level allows increases in fuel temperature to be limited even when a part of a fuel channel 102 (FIG. 2) for leading fuel to the engine 16 is positioned in the power-generation compartment 12. Keeping the power-generation compartment 12 at a proper temperature thus allows increases in fuel temperature to be limited and allows fuel to be stably and efficiently supplied to the engine 16.

An example of operating the adjustment boss 78 and adjusting the tappet clearance will be described next with reference to FIG. 12.

Figure 12A:
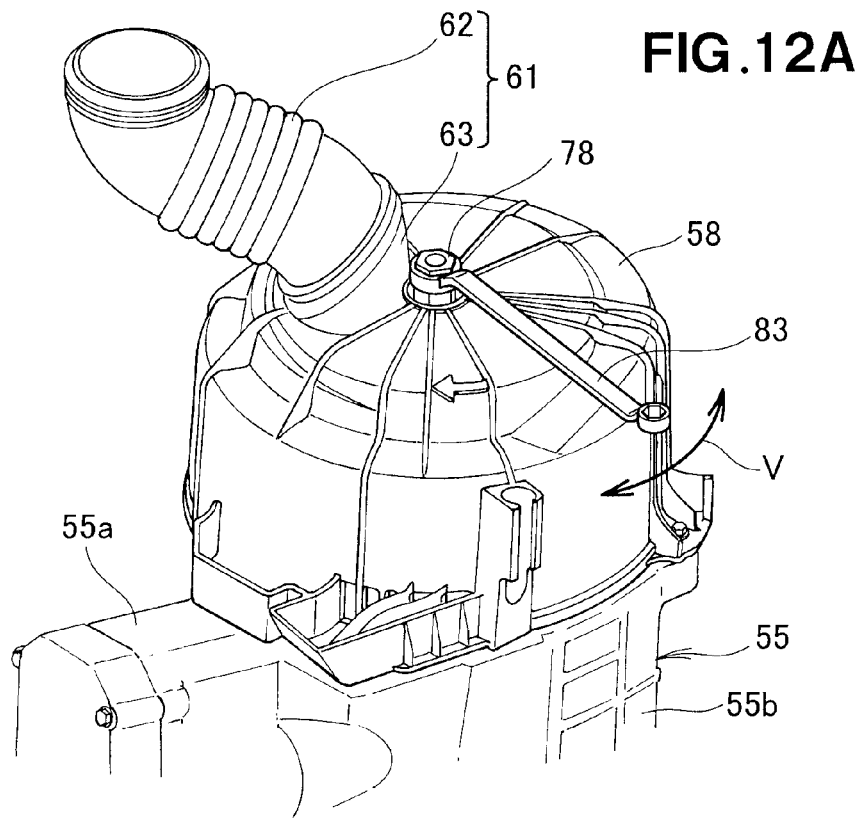
FIGS. 12A and 12B are views illustrating an example operation of an adjustment boss to adjust a tappet clearance.

As shown in FIG. 12A, the offset wrench 83 is engaged with the adjustment boss 78, and the offset wrench 83 is operated as shown by arrow V. Operating the offset wrench 83 allows the adjustment boss 78 (i.e., the ventilation fan 57 (see FIG. 12B)) to be turned.

Figure 12B:
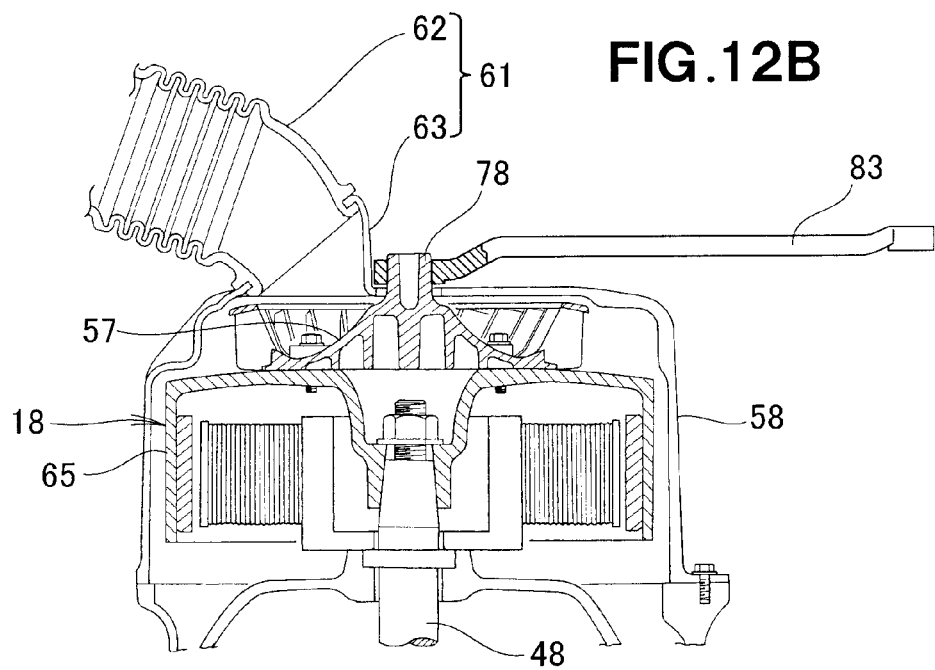

As shown in FIG. 12B, turning the ventilation fan 57 turns the rotor 65 of the electrical generator 18. Turning the rotor 65 turns the crankshaft 48 and positions the piston at top dead center. The gap (i.e., the tappet clearance) between the valve shafts and the rocker arms is adjusted in a state in which the piston is at top dead center, and the intake valve and the exhaust valve are closed.

The cogeneration apparatus according to the present invention is not limited to aforedescribed embodiment; appropriate modifications, improvements, and the like are possible. For example, in the embodiment, an example was given in which the gas engine 16 was used as the motor, but this is not given by way of limitation; a gasoline engine or other engine can also be used.

In the embodiment, an example was described in which the second channel outlet 63a was formed in an elliptical shape, but this is not given by way of limitation; the second channel outlet 63a can also be formed as a long hole, a circle, a bent long hole, or another shape. A long hole or a bent long hole in this instance is formed so as to lengthen toward the circumferential direction of the lid part 87.

The shapes and configurations of the cogeneration apparatus 10, the cogeneration case 11, the engine 16, the electrical generator 18, the heat exchanger 19, the first and second control parts 21, 23, the power converter part 22, the outside-air introducing part 42, the exhaust passage 46, the exhaust inlet 46a, the exhaust outlet 46b, the crankshaft 48, the ventilation fan 57, the fan cover 58, the ventilation-introducing channel 61, the adjustment boss 78, the cover outlet 91 and the like given in the embodiment are not limited to the examples given, and appropriate modifications are possible.

The present invention involves driving a ventilation fan and thereby allows ventilating the interior of a housing. The present invention is appropriately applied to a cogeneration apparatus that is capable of cooling electrical components, an electrical generator, and a motor.

Obviously, various minor changes and modifications of the present invention are possible in light of the above teaching. It is therefore to be understood that within the scope of the appended claims the invention may be practiced otherwise than as specifically described.

What is claimed is:
1. A cogeneration apparatus comprising:
a housing having an interior space partitioned into a power-generation compartment and an electrical-equipment compartment communicating with atmosphere through an outside-air-introducing part;
a motor accommodated in the power-generation compartment;
an electrical generator accommodated in the power-generation compartment and adapted to be driven by the motor;
a ventilation fan, accommodated in the power-generation compartment, for leading a cooling air flow to the electrical generator;
a heat exchanger, accommodated in the power-generation compartment, for generating hot water using waste heat of the motor as a heat source;

a control part, accommodated in the electrical-equipment compartment, for controlling the motor; and a power converter part, accommodated in the electrical-equipment compartment, for converting alternating-current power produced by the electrical generator into electrical power of a desired format, wherein the cogeneration apparatus further comprises a ventilation-introducing channel placing the electrical-equipment compartment in communication with the ventilation fan, so that driving the ventilation fan causes air to be led from outside the housing through the electrical-equipment compartment to inside the ventilation-introducing channel, the air led to inside the ventilation-introducing channel is led to the electrical generator, and the air led to the electrical generator is exhausted through the power-generation compartment to outside the housing.

2. The apparatus according to claim 1, wherein the electrical generator and the ventilation fan are covered by a fan cover, and the ventilation-introducing channel has a channel outlet opening into the fan cover, so that air is led from the channel outlet of the ventilation-introducing channel to inside the fan cover to cool the electrical generator and is then led from inside the fan cover to the electrical-equipment compartment.

3. The apparatus according to claim 2, wherein the ventilation-introducing channel has a channel inlet that opens into the electrical-equipment compartment and is disposed higher than the channel outlet of the ventilation-introducing channel.

4. The apparatus according to claim 3, wherein the housing comprises an exhaust passage having an exhaust inlet and an exhaust outlet for exhausting to the atmosphere air led out to the power-generation compartment, the exhaust inlet communicating with the power-generation compartment, the exhaust outlet communicating with the atmosphere, and the exhaust inlet is disposed higher than the motor and the heat exchanger.

5. The apparatus according to claim 4, wherein the fan cover comprises a cover outlet for leading air from the interior of the fan cover to the power-generation compartment, and the cover outlet is disposed lower than the exhaust inlet.

6. The apparatus according to claim 3, wherein the electrical generator within the fan cover is linked to a crankshaft of the motor, the ventilation fan comprises an adjustment boss linked to the electrical generator and protruding upward from a cover aperture of the fan cover so that the crankshaft is rotated by operating the adjustment boss from outside the fan cover, and the channel outlet of the ventilation-introducing channel is formed at an offset site of the fan cover, located away from the cover aperture of the fan cover.

7. The apparatus according to claim 3, wherein the channel inlet of the ventilation-introducing channel and the channel outlet of the ventilation-introducing channel are both set to have a fixed cross-sectional channel area.

8. The apparatus according to claim 4, wherein the exhaust passage comprises a sound-absorbing material.

* * * * *